Dec. 9, 1952     T. E. MARSHALL, III     2,620,692
ELECTRICALLY HEATED WIRE STRIPPING TOOL
Filed Oct. 20, 1950
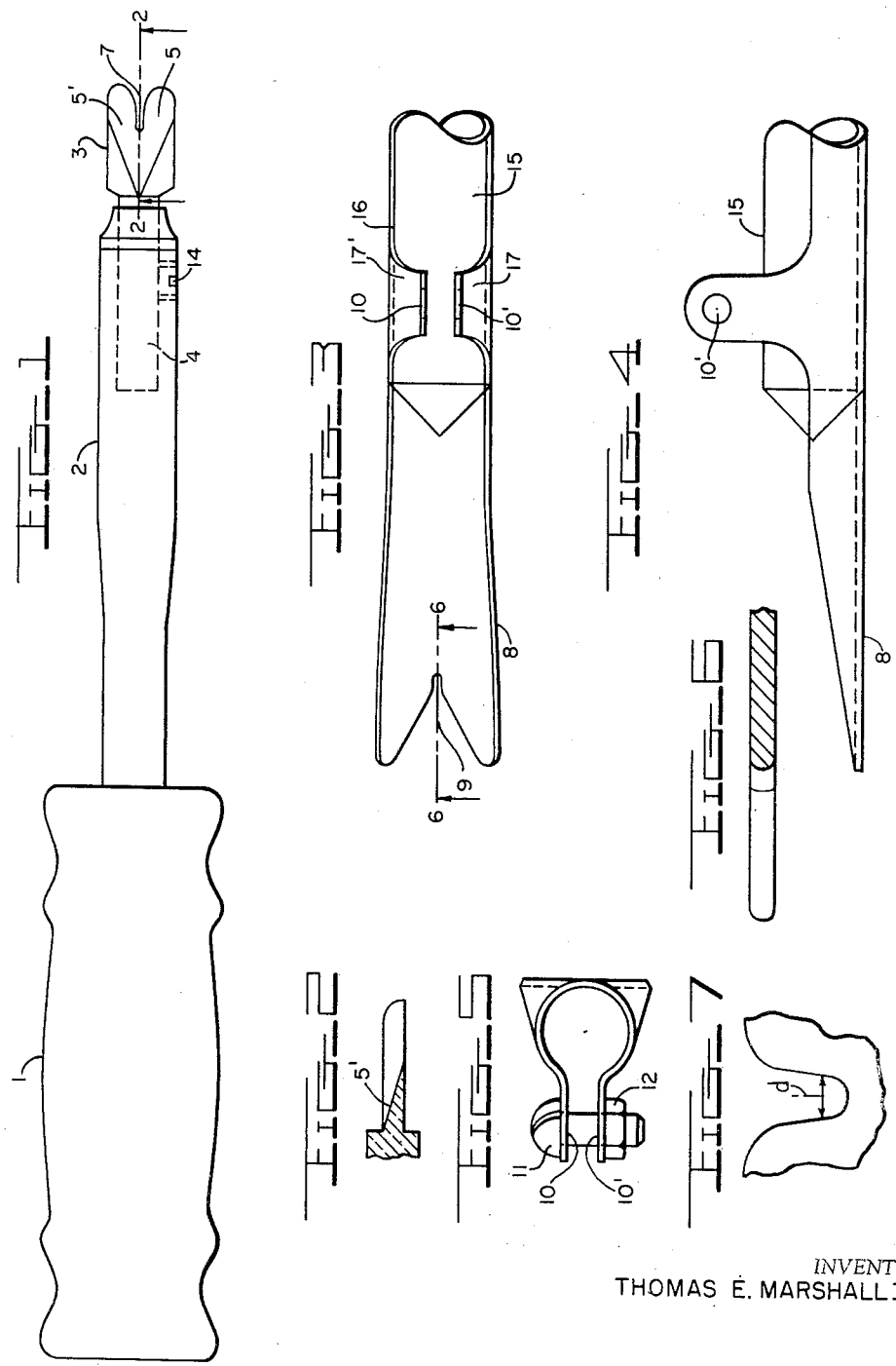
*INVENTOR*
THOMAS E. MARSHALL III
BY
ATTORNEYS Patented Dec. 9, 1952

2,620,692

UNITED STATES PATENT OFFICE 2,620,692

ELECTRICALLY HEATED WIRE STRIPPING TOOL

Thomas E. Marshall, III, Arlington, Va.

Application October 20, 1950, Serial No. 191,297

1 Claim. (Cl. 81—9.5)

(Granted under the act of March 3, 1883, as amended April 30, 1928; 370 O. G. 757)

The present invention relates to a method and apparatus for stripping insulation from a wire.

The common prior art method for stripping insulation from a wire or the like has been by means of a plier type tool having sharp edges for biting into the insulation. These tools are difficult to use, and often result in damage to the wire due to the plier jaws biting into the wire. This, of course, weakens the wire and is often the cause of equipment failure when the weakened portion of the wire breaks.

The importance of having a wire free from any nicks or the like is accentuated when the wire is to be placed under tension.

In avoiding the foregoing disadvantages the present invention provides a novel electrically heated knife edge tool for separating thermal plastic insulation from a wire or the like.

An object of the present invention is therefore to provide a method and apparatus for stripping insulation from wire with ease and with a minimum of danger of damaging the wire.

Another object of the present invention is to provide a relatively inexpensive tool which is adaptable for use with a conventional soldering iron for the purpose of cleanly and simply stripping insulation from a wire.

These and other objects of the present invention will become apparent from the specification and drawings wherein:

Figure 1 shows in side elevation one embodiment of the present invention in which the novel wire stripping head provided herein is incorporated in a conventional soldering iron.

Figure 2 is a cross-sectional view of the stripping head along plane 2—2 shown in Figure 1.

Figure 3 shows a top view of another embodiment of the present invention shown engaging the tip of a conventional soldering iron.

Figure 4 is a front view of the embodiment shown in Figure 3.

Figure 5 is a side view of the embodiment of Figure 3 with the clamping bolt added.

Figure 6 is a cross-sectional view along section line 6—6 of Figure 3.

Figure 7 is an enlarged view of the bottom of groove 7.

The apparatus comprising the present invention broadly comprises a stripping head made of any suitable material having a high conductivity of heat and is provided with a V-shaped notch formed in one edge thereof. The edges of the notch are relatively narrow so as to provide a clean and smooth break in the insulation and to aid in prying off the insulation.

In accordance with another aspect of the present invention the body of the stripping head is made in the form of a semi-cylindrical hollow member provided with a clamping means for changing the cross-section of the cylindrical section so that it can conveniently and easily engage the cylindrical tip of a conventional soldering iron.

Referring now to the embodiment shown in Figures 1—2, the stripping head 3 comprises a material having a high conductivity of heat such as copper, brass, or stainless steel in which a gradually tapering notch 7 is cut. The base of the notch is rounded to a diameter of the smallest wire with which the tool is to be used so that damage to the wire will be alleviated.

To aid in prying loose the insulation the thickness of the metal adjacent the notch is made relatively thin. Since the heat transmitted by the head melts or softens the insulation, little pressure is required to pry the insulation loose so that there is little chance that the thin edges will damage the wire. If the wire used is very soft then the sharpness of the edges of notch 7 can be reduced by filing if desired.

The thin edge of the notch is formed by providing two slanting plane surfaces 5 and 5' which provide a gradually tapering surface.

Head 3 is shown provided with a body portion 4 which fits into a recess located in the barrel 2 of a conventional iron in place of the tip found in the soldering iron. As is well known, the barrel portion 2 of the soldering iron contains the heating element (not shown).

The stripping head is kept in place as by screw 14 threaded into the barrel at a right angle to the longitudinal axis of the recess.

The embodiment shown in Figures 3–6 is the preferred embodiment of the invention because of its cheapness and ease of manufacture as well as its ease of connection with a conventional soldering iron having a tip of varying sizes.

This embodiment may be made very readily as by a stamping process. A sheet of $\frac{1}{16}$" brass, for example, is cut or stamped so that the base portion 16 forms a partial cylinder. The edges of the notch 7 are rounded or sharpened as shown by the cross-sectional view of Figure 6.

The notch 7 has the same general shape as that of the embodiment of Figures 1—2.

The tip 15 of a soldering iron is conveniently clamped within the base portion 16 of the stripping head as by bolt and nut 11—12 which passes through holes 10—10' provided in arms 17—17' which extend from base portion 16.

For many applications it is best that a layer of carbon does not form on the head portion 3 and thus for such application brass and stainless steel are preferred to copper.

The present invention has utility mainly for stripping insulation made from a thermoplastic material or the like which is readily meltable.

The best method of utilizing the apparatus of the present invention is as follows:

The insulated wire is placed in notch 7 and the wire or the soldering iron is rotated so that the heat therefrom melts portions substantially all around the insulated wire. Then a small amount of pressure applied generally lengthwise and into the insulated wire by the head of the wire stripping tool will separate the insulation baring the wire beneath.

It is important that the edges of the notch 7 be narrow so that the heat is concentrated along the stripping edges of the notches and so that a clean separation of insulation results.

The present invention is best suited to stripping insulation from a wire whose diameter (the diameter of the wire) is equal to the diameter $d$ of the rounded portion at the base of the notch as shown in Figure 7. There is less chance of damaging the wire in such case since the easily applied pressure from the tapered portion of the groove will then only be applied to the insulation.

The inner diameter of insulation on the wire should be greater than the smallest diameter $d$ of notch 7 for best results.

Many modifications may be made of the exemplary embodiments shown in the drawings without deviating from the scope of the present invention.

The invention described herein may be manufactured and used by or for the Government of the United States of America for governmental purposes without the payment of any royalties thereon or therefor.

What is claimed is:

A portable insulation stripper tool comprising a soldering iron barrel containing a heating element therein and having a recess located at one extremity of the barrel, a body member made of heat conductive material having a head portion and a base portion, said base portion being seated in the recess of said soldering iron barrel close to the heating element, said head portion having a flat first side and a second side having a flat surface parallel to said first side, said second side also having walls formed by two plane surfaces slanted to intersect in a line oblique to the longitudinal axis of said body member, said walls intersecting the flat surface of said second side forming a V-shaped notch having knife-like edges to concentrate the heat over a small area of the insulation of the wire to be stripped, the width of said sides of said body member being less than the diameter of said soldering iron barrel thereby permitting the tool to be used in inaccessible areas.

THOMAS E. MARSHALL III.

REFERENCES CITED

The following references are of record in the file of this patent:

UNITED STATES PATENTS

| Number | Name | Date |
|---|---|---|
| 698,567 | Sibley | Apr. 29, 1902 |
| 1,632,320 | Sippel et al. | June 14, 1927 |
| 2,415,669 | Beuschel | Feb. 11, 1947 |
| 2,417,943 | Muller | Mar. 25, 1947 |
| 2,468,818 | Fox | May 3, 1949 |

FOREIGN PATENTS

| Number | Country | Date |
|---|---|---|
| 372,896 | Great Britain | May 19, 1932 |
| 581,618 | Great Britain | Oct. 18, 1946 |